United States Patent
Przybylski et al.

(10) Patent No.: US 11,263,922 B2
(45) Date of Patent: Mar. 1, 2022

(54) CANNULATION SIMULATION

(71) Applicant: Wisconsin Alumni Research Foundation, Madison, WI (US)

(72) Inventors: Erick Lee Przybylski, Deforest, WI (US); Mengizem Tizale, Madison, WI (US); Joshua Hermsen, Verona, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 299 days.

(21) Appl. No.: 16/527,417

(22) Filed: Jul. 31, 2019

(65) Prior Publication Data

US 2021/0035471 A1 Feb. 4, 2021

(51) Int. Cl.
G09B 23/30 (2006.01)
G09B 23/28 (2006.01)
G09B 23/34 (2006.01)

(52) U.S. Cl.
CPC ........... *G09B 23/285* (2013.01); *G09B 23/34* (2013.01)

(58) Field of Classification Search
CPC ....... G09B 23/28; G09B 23/30; G09B 23/303
See application file for complete search history.

(56) References Cited

U.S. PATENT DOCUMENTS

| | | | | |
|---|---|---|---|---|
| 2,995,832 A * | 8/1961 | Alderson | .............. | G09B 23/285 434/268 |
| 3,789,518 A * | 2/1974 | Chase | .................... | G09B 23/34 434/272 |
| 4,182,054 A * | 1/1980 | Wise | .................... | G09B 23/285 434/268 |
| 5,215,469 A * | 6/1993 | Kohnke | ............... | G09B 23/285 434/268 |
| 5,839,904 A * | 11/1998 | Bloom | ................. | G09B 23/285 434/268 |
| 7,306,465 B2 * | 12/2007 | White | .................. | G09B 23/285 434/268 |
| 8,408,920 B2 * | 4/2013 | Speller | ................. | G09B 23/285 434/268 |
| 8,690,580 B2 * | 4/2014 | Paronen | ................. | G09B 23/30 434/267 |
| 9,342,996 B2 * | 5/2016 | King | .................... | G09B 23/303 |
| 10,242,598 B2 * | 3/2019 | Ozaki | .................... | G09B 23/34 |

(Continued)

FOREIGN PATENT DOCUMENTS

WO 2018102287 A1 6/2018

*Primary Examiner* — Kurt Fernstrom
(74) *Attorney, Agent, or Firm* — Crawford Maunu PLLC

(57) ABSTRACT

Aspects of the disclosure are directed to methods and/or apparatuses that may facilitate simulation for various cannulation activities. As may be implemented consistent with one or more embodiments herein, an apparatus includes a pliable surface structure having an inner surface and an outer surface, a tube adjacent the inner surface, and a tank configured to hold fluid and to receive fluid exiting from the tube. The tube and pliable surface structure simulate a blood vessel below the inner surface of the pliable surface structure. The tank operates with the tube and the pliable surface to receive a cannula passed through the pliable surface, into the tube and extending into the tank, and facilitates simulated blood flow in the tube below the inner surface of the pliable surface structure via fluid pumped from the tank, through the tube and back into the tank.

20 Claims, 7 Drawing Sheets

(56) References Cited

U.S. PATENT DOCUMENTS

| | | | |
|---|---|---|---|
| 10,540,913 B2* | 1/2020 | Kinsella | G09B 23/285 |
| 2010/0196865 A1* | 8/2010 | Kays | G09B 23/32 |
| | | | 434/268 |
| 2011/0008760 A1* | 1/2011 | Bevan | G09B 23/28 |
| | | | 434/268 |
| 2013/0052626 A1* | 2/2013 | Hoskins | G09B 23/285 |
| | | | 434/268 |
| 2013/0078603 A1* | 3/2013 | Yang | G09B 23/285 |
| | | | 434/268 |
| 2013/0309643 A1* | 11/2013 | Segall | G09B 23/303 |
| | | | 434/268 |
| 2014/0302474 A1* | 10/2014 | Sakezles | G09B 23/303 |
| | | | 434/268 |
| 2016/0171911 A1* | 6/2016 | Parry, Jr. | G09B 23/30 |
| | | | 434/268 |
| 2018/0158373 A1* | 6/2018 | Hendrickson | G09B 9/00 |
| 2019/0027064 A1* | 1/2019 | Nelson | G09B 23/303 |
| 2019/0027066 A1* | 1/2019 | Altermatt Couratier | |
| | | | G09B 23/303 |
| 2019/0139452 A1* | 5/2019 | Hall-Jackson | G09B 23/285 |
| 2019/0333413 A1* | 10/2019 | Bauer | G09B 23/303 |
| 2020/0078093 A1* | 3/2020 | Bohl | B33Y 70/00 |
| 2020/0126449 A1* | 4/2020 | Horst | G09B 23/286 |
| 2020/0135057 A1* | 4/2020 | Fatimi | G09B 23/32 |

* cited by examiner

CANNULATION SIMULATION

OVERVIEW

Aspects of the present disclosure are directed to methods and/or apparatuses that may facilitate simulation for cannulation activities.

Various aspects are directed to addressing challenges to providing realistic simulation of medical procedures. One such procedure is the extracorporeal membrane oxygenation (ECMO) procedure, which is a technique for providing prolonged cardiac and respiratory support to persons whose heart and lungs are unable to provide an adequate amount of gas exchange or perfusion to sustain life. ECMO works by removing blood from the person's body, removing carbon dioxide and oxygenating red blood cells.

While it is helpful for medical practitioners to carry out simulation, doing so for cannulation activities can be challenging. These and other matters have presented challenges to the development and practice of cannulation procedures, for a variety of applications.

SUMMARY

Various example embodiments are directed to apparatuses and methods, which may address various challenges including those noted above.

As may be implemented consistent with one or more embodiments herein, an apparatus includes a pliable surface structure having an inner surface and an outer surface, a tube adjacent the inner surface, and a tank configured to hold fluid and to receive fluid exiting from the tube. The tube is configured with the pliable surface structure to simulate a blood vessel below the inner surface of the pliable surface structure. The tank is configured to operate with the tube and the pliable surface to receive a cannula passed through the pliable surface, into the tube and extending into the tank, and facilitate simulated blood flow in the tube below the inner surface of the pliable surface structure via fluid pumped from the tank, through the tube and back into the tank.

Another embodiment is directed to a method as follows. A cannula is inserted through a pliable surface structure having an inner surface and an outer surface, into a tube extending adjacent the inner surface of the pliable surface structure, and extending into a tank configured to hold fluid and to receive fluid exiting from the tube. Blood flow in the tube below the inner surface of the pliable surface structure is simulated by pumping fluid from the tank, through the tube and back into the tank.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which.

Figure 1:
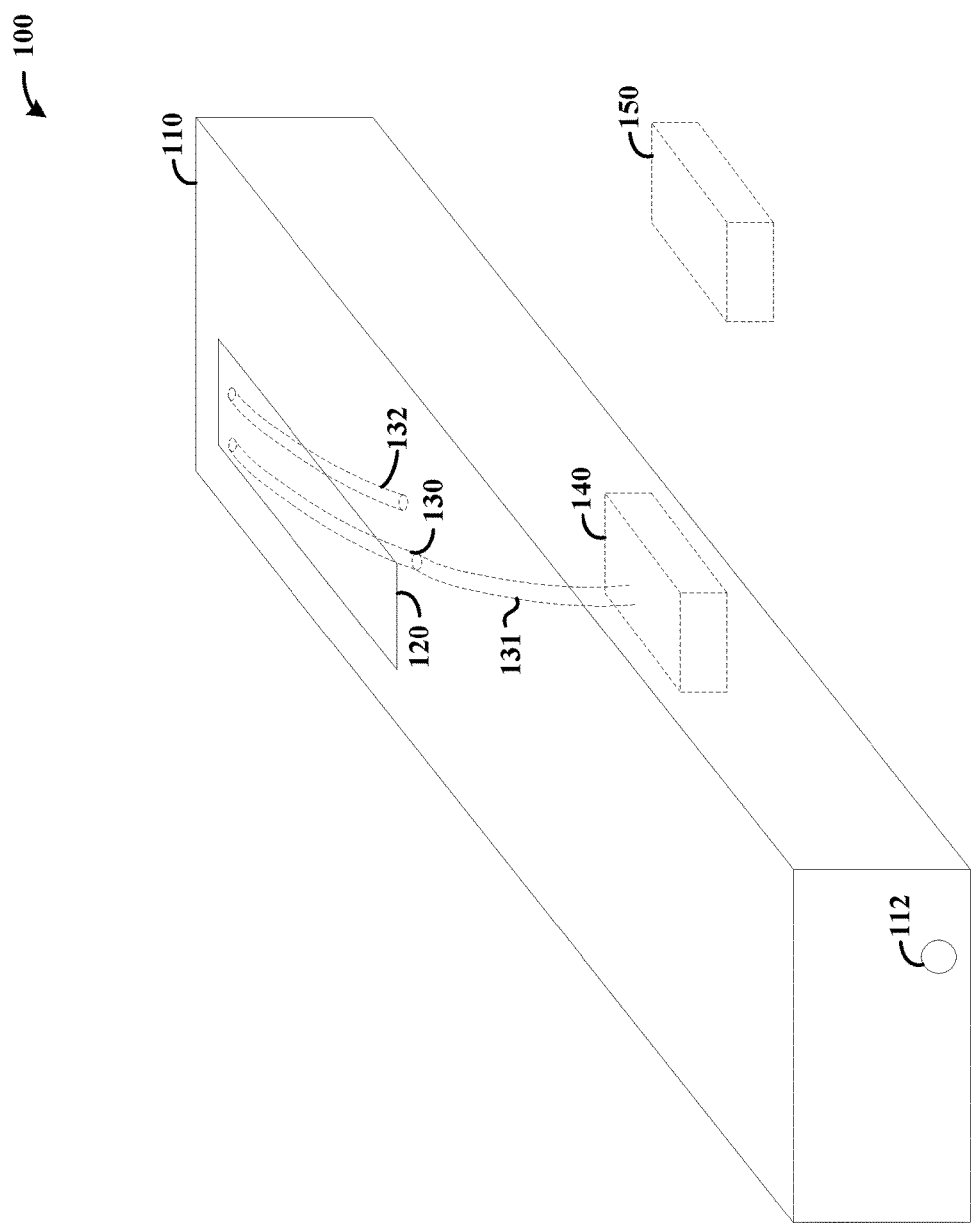
FIG. 1 shows a perspective view of an apparatus for simulating cannulation, as may be implemented in accordance with various embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of apparatuses, systems and methods involving cannulation. Various aspects of the present disclosure have been shown to be beneficial when used in the context of a training apparatus for simulating human anatomy for and response to cannulation. In particular implementations, a cannulation approach involves the utilization of a fluid tank and a pliable surface structure with a tube below. The surface structure and tube may simulate human skin with a blood vessel underneath, with the tube being coupled to the fluid tank for passing of a cannula therein, and for flowing fluid from the tank through the tube. In various implementations, the apparatus is coupled to an external pump, as may be utilized for an ECMO procedure, and operates to flow fluid from the tank, through the external pump, and back into the tank via the cannula within the tube and tank.

Certain implementations involving a cannulation training apparatus facilitate both cannulation and pulsatile flow. A peristaltic pump, which may be disconnected after cannulation, operates to generate pulsatile fluid flow in a subsurface tube as characterized herein. The peristaltic pump may be located within the cannulation training apparatus (e.g., in the tank or external to the tank), or external to the cannulation training apparatus. Techniques for identifying the location of blood vessels can then be used with the training apparatus, such as by employing ultrasound to detect pulsations in the fluid flow. Once the subsurface tube is identified, a cannula can be inserted therein and the line can be connected to an external pump, such as an actual ECMO pump. In these and other contexts herein, pulsatile flow may refer to fluid flow with periodic variations. For instance, pulsatile flow may be generated by a rotating mechanism pumping the fluid, such as a peristaltic pump.

Two or more subsurface tubes can be used for simulating flow in blood vessels. For instance, one tube may simulate flow in an artery and the other may simulate flow in a vein. In other instances, both tubes simulate flow in veins. When simulating a patient whose heart is not functioning, the tubes may simply simulate blood vessels in which blood is not flowing. Cannula may be inserted into each tube and used to simulate various procedures. For instance, where an ECMO procedure is to be simulated, a cannula in one of the tubes may be used to draw fluid from the tank into an ECMO machine, and another cannula in another one of the tubes may be used to return fluid from the ECMO machine, into the tank.

As may be implemented consistent with one or more embodiments herein, an apparatus includes a pliable surface structure having an inner surface and an outer surface, a tube adjacent the inner surface, and a tank configured to hold fluid and to receive fluid exiting from the tube. The tube and the pliable surface structure simulate a blood vessel below human skin tissue, simulated by the pliable surface structure with the tube below and adjacent the inner surface, such as may be similar to vessels found in a human groin or thigh area. The tank operates with the tube and the pliable surface to receive a cannula that is passed through the pliable surface, into the tube and extending into the tank. Blood flow can be simulated in the tube below the inner surface of the pliable surface structure, via fluid pumped from the tank, through the tube and back into the tank. The tube may pass far enough into the tank to receive and include a full length of a cannula inserted for simulation, or may be relatively shorter with cannula extending out of the tube into the tank. As may be consistent with aspects discussed above, such an approach may facilitate pumping of the fluid out of the tank, through an actual ECMO machine (having an ECMO pump), and back into the tank via the cannula and the tube, therein simulating human vascular response to treatment via the ECMO pump.

In various embodiments, the apparatus also includes one or more pumps. For instance, a pump may be utilized with the tank and the tube to provide fluid flow through the tube that simulates the blood flow. Such a pump may be a peristaltic pump that simulates pulsatile blood flow through the tube to represent an artery, which can in turn be utilized to simulate cannulation procedures in which a patient's heart is functional such that pulsatile flow can be used to detect an artery for insertion of a cannula. The pump can be switched off or otherwise disengaged, once cannulation is obtained. This can be manual or, for example, may involve use of a fluid flow sensor or other sensor that can detect insertion of a cannula into the tube.

An external pump may also be used to generate flow using fluid drawn from the tank, passed through the cannula and back into the tank. Consistent with the above, such a pump may be utilized an ECMO device, in which the fluid is processed in accordance with the processing of human blood.

In some embodiments, the apparatus includes a second tube extending into the tank and operable to facilitate withdrawal of fluid from the tank, and pumping of the withdrawn fluid back into the tank via the aforementioned (first) tube, using a cannula inserted through the pliable surface structure, into the tube and tank. For instance, in response to cannulation of both tubes with cannula and connection of the cannula to an external pump, fluid can be drawn from the tank into the external pump via the second tube, and passed back into the tank from the external pump via the first tube extending adjacent the inner surface. The second tube may also extend adjacent the inner surface of the pliable surface structure, and may simulate a blood vessel below the inner surface of the pliable surface structure. This approach may, for example, simulate an ECMO procedure in which cannula are inserted into a patient's groin or thigh area, with two blood vessels.

In certain embodiments, the second tube is located away from the first tube and the (first) pliable surface structure, adjacent a second pliable surface structure that is separated from the first pliable surface structure. The second pliable surface structure also has an inner surface and an outer surface, and may simulate human skin tissue. The second tube can thus extend adjacent (and below) the inner surface of the second pliable surface structure to simulate a blood vessel (e.g., below human skin). This may, for example, involve placement of the second pliable surface in a location relative to the first pliable surface that would simulate a second cannulation location for a human patient. In certain instances, the second pliable surface is a surface of the tank, and in other instances is remote from the tank with the second tube extending into the tank. Such approaches may involve cannulation locations near the neck or chest area of a human torso (on a training manikin), with the tank extending to such a position and/or the second tube and second surface structure being located remote from the tank.

A variety of tank shapes may be utilized, and may be placed in a variety of locations when implemented with a structure mimicking a human torso. Certain tanks are split or otherwise coupled to represent different regions of a human patient (e.g., thigh and chest/neck regions). In some implementations, a tank is shaped with an underside surface that follows the external surface of a training manikin, and includes a skin-like pliable structure on an upper surface for cannulation. The capacity of the tank may vary to simulate different patients, such as by simulating an adult patient by providing a 3 liter capacity. A variety of ports may be utilized to tubing in the tank to an external pump and/or to a peristaltic pump. A 3rd port for filling and draining would be located at the bottom right of the tank.

In certain embodiments, the tank may be designed to fit into or onto a cavernous structure having the shape of a human torso and leg, such as a training manikin. For instance, a tank may be integrated into a training manikin's torso, or coupled to an external region of the manikin in a shape that facilitates cannulation into a particular region (e.g., a patient's groin or thigh region), and with a length sufficient to accept a cannula length that is similar to that utilized in an ECMO procedure on an adult human. When implemented for placement on a training manikin, the tank has a lower surface that follows the contours of the training manikin and shape of a human torso and leg. The pliable surface may be on an upper surface of the tank, and may be located on a region corresponding to the leg. The tank may thus extend upward along the human torso, with the tube residing in the tank, and facilitate cannulation from the groin upward toward the training manikin's chest. The tank may have a sidewall that includes the pliable surface structure. Further, the tank may be provided with sufficient rigidity to flow fluid through the tube and to simulate, in response to cannulation of the fluid tube via the pliable surface and connection of a cannula to an external pump, blood flow in a human body. The rigidity may thus be such that the tank does not collapse under the draw of an ECMO pump. In this context, it has been recognized/discovered that, the use of an internal, rigid tank facilitates simulation of blood flow for cannulation and subsequent connection to an external ECMO machine.

The various apparatuses described herein and shown in connection with the figures may represent one or more method embodiments, relating to the use and/or manufacture of the apparatuses. In a particular method-based embodiment, a cannula is inserted through a pliable surface structure having an inner surface and an outer surface, into a tube extending adjacent the inner surface of the pliable surface structure, and extending into a tank that holds fluid and receives fluid exiting from the tube. In this context, the cannula may reside within the tube with the tube extending at a distance into the tank, or may be extended beyond an end of the tube in the tank. Blood flow in the tube below the inner surface of the pliable surface structure is simulated by pumping fluid from the tank, through the tube and back into the tank. The pliable surface structure may be integrated within a surface of the tank. The tank may be configured with an underlying surface that conforms to the shape of a training manikin, or may be integrated within such a training manikin (e.g., with the pliable surface structure corresponding to a sink region of the training manikin). This pumping of fluid may, for example, involve generating peristaltic flow through the tube for simulating blood flow through an artery.

In certain implementations, an external pump is coupled to the cannula and fluid is pumped from the tank into the external pump, and from the external pump back into the tank via the tube and cannula. For instance, an ECMO pump may be used as noted herein for simulating human vascular response to treatment via the ECMO pump with the cannula, pliable surface, tube and tank.

Some embodiments further involve inserting a second cannula into a second tube that extends into the tank. Fluid may be pumped from the tank via the second cannula and the second tube to the external pump, and to an external pump. In some implementations, the pliable surface structure is part of a cavernous structure having the shape of a human torso and leg, with pliable surface being and located on the shape of the leg. The second cannula through a second pliable surface structure having an inner surface and an outer surface that are part of the tank (and, in some instances, also part of the cavernous structure), in which the second tube extends adjacent the inner surface of the second pliable surface structure.

Turning now to the figures, FIG. 1 shows a perspective view of an apparatus 100 for simulating cannulation, as may be implemented in accordance with various embodiments. The apparatus 100 includes a tank 110, a pliable surface structure 120, and a tube 130 under the pliable surface structure for flowing fluid therein. The tube 130 and pliable surface structure 120 simulate a blood vessel underneath human skin, and the tank 110 may be filled with a fluid for passing through the tube 130.

In some implementations, the apparatus 100 also includes a pump 140 that is coupled by extended tube portion 131 for flowing fluid through the tube 130. For instance, the pump 140 may be a peristaltic pump that generates pulsatile flow in the tube 130, using fluid from the tank 110.

A second tube 132 may also be provided, and may be utilized to facilitate cannulation simulation involving the use of two respective blood vessels. For instance, a cannula can be inserted into tube 130 for drawing fluid from the tank 110, and another cannula can be inserted into tube 132 for returning fluid to the tank. Such an approach may simulate cannulation for an ECMO procedure involving cannulation of a patient's groin/thigh area.

In certain implementations, an external pump 150 is utilized and coupled to one or both of the tubes 130 and 132, for pumping fluid from the tank 110 and returning it into the tank. For instance, where both tubes 130 and 132 are present, a cannula inserted in tube 130 may be utilized to draw fluid from the tank and to the pump 150, and a second cannula inserted in tube 132 may be used to return fluid from the pump to the tank. Cannula lines can thus be coupled accordingly. In some instances, the pump 150 is coupled to the tank 110 by way of a coupling 112, such as a drainage type port. In various contexts, the pump 150 is part of an ECMO machine, and used to simulate cannulation and flow of blood in a human, via the tank 110, tube 130 (and 132 if used), via the pliable surface structure 120.

The length of the tank 110 can be set such that a cannula having a length sufficient to facilitate cannulation in a human can be inserted via one or both tubes 130 and 132, and extend into the tank. In some implementations, one or both tubes 130 and 132 are extended in length, to simulate a longer blood vessel.

Figure 2:
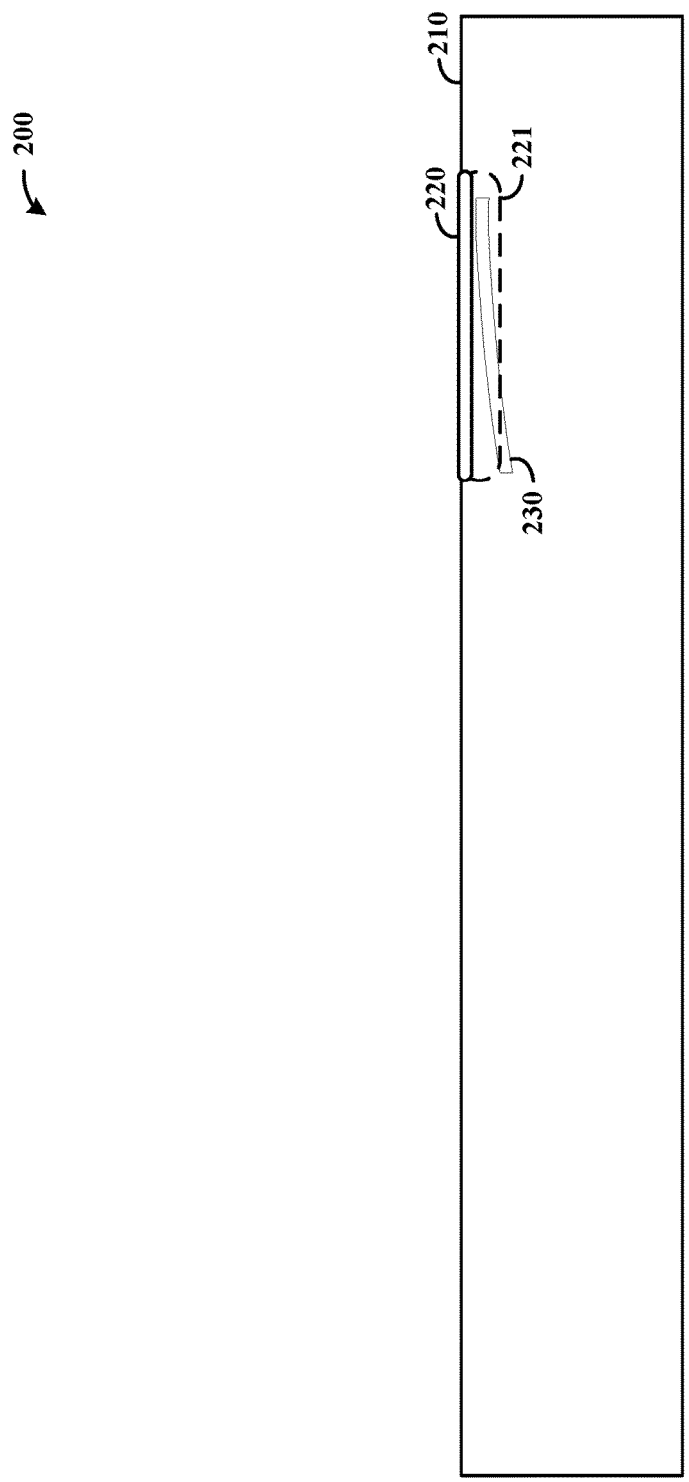
FIG. 2 shows a cross-sectional view of an apparatus for simulating cannulation, as may be implemented in accordance with various embodiments.

FIG. 2 shows a cross-sectional view of an apparatus 200 for simulating cannulation, as may be implemented in accordance with various embodiments. The apparatus 200 may, for example, be implemented in accordance with the apparatus 100 shown in FIG. 1, and as described above. A tank 210 is coupled to a pliable surface structure 220, and includes a tube 230 below an upper surface of the surface structure. In some implementations, the pliable surface structure extends further into the tank as shown at 221, and the tube 230 is at least partially embedded therein. In these contexts, the tube 230 and pliable surface structure 220 may simulate human skin tissue as well as other related tissue in which a blood vessel resides below the skin.

Figure 3A:
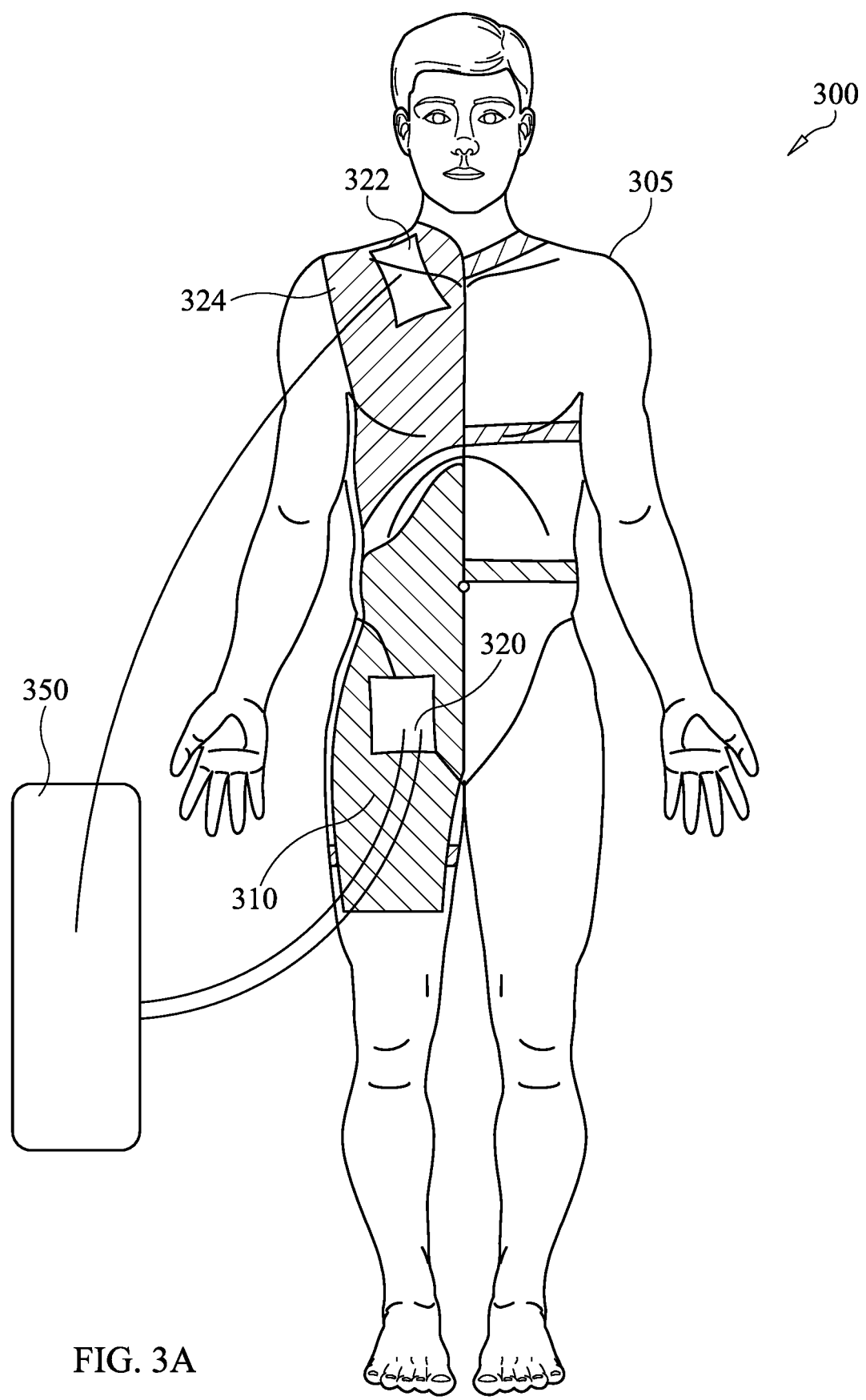
FIG. 3A shows an apparatus for simulating cannulation utilized with a cavernous structure that simulates a human torso and leg, as may be implemented in accordance with various embodiments.

FIGS. 3A-3D show an apparatus 300 for simulating cannulation and utilized with a cavernous structure 305 that simulates a human torso and leg (e.g., a medical training manikin), as may be implemented in accordance with various embodiments. Referring to FIG. 3A, the apparatus 300 includes a tank 310 and a pliable surface structure 320 that simulates human skin tissue. One or more tubes are located below an upper surface of the pliable surface structure 320 and extend into the tank 310, for simulating blood vessels therein. For instance, the pliable surface structure 320 may be implemented in a manner similar to the pliable surface structure 220 shown in FIG. 2, with tube 230 embedded at least partially therein and extending into the tank 310.

Figure 3B:
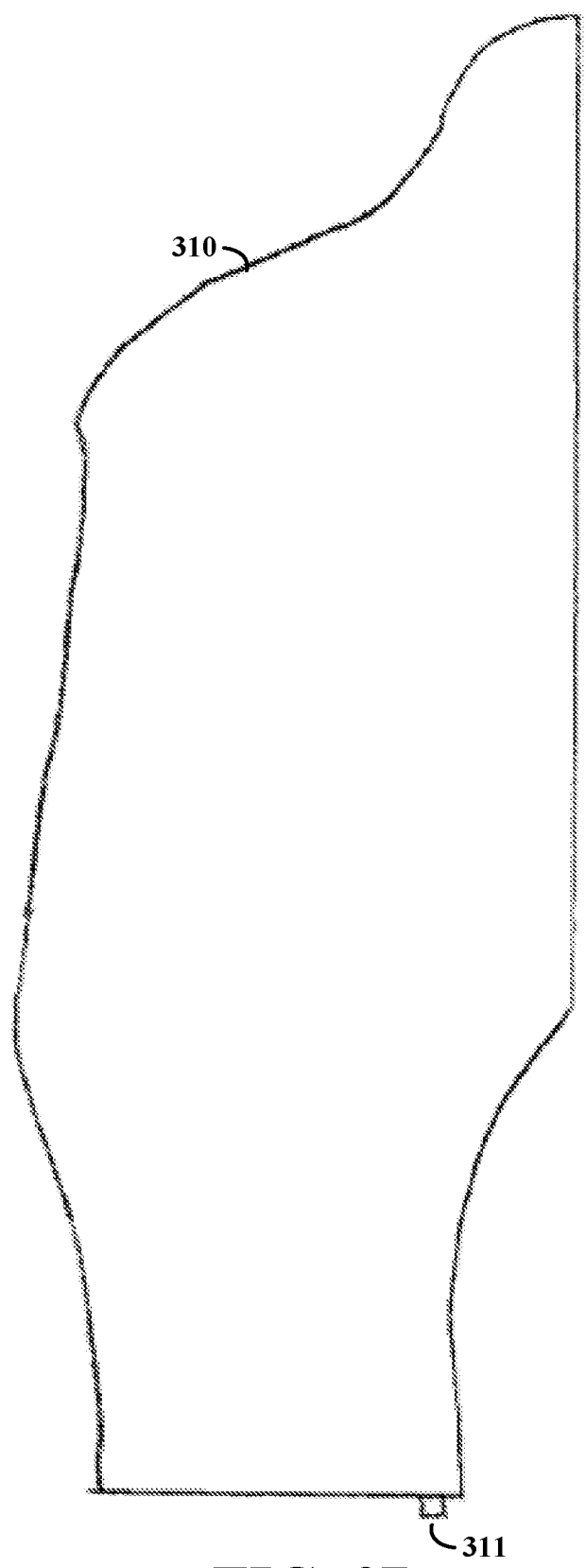
FIG. 3B shows a tank and related structure, as may be implemented with the cavernous structure of FIG. 3A and in accordance with various embodiments.
Figure 3C:
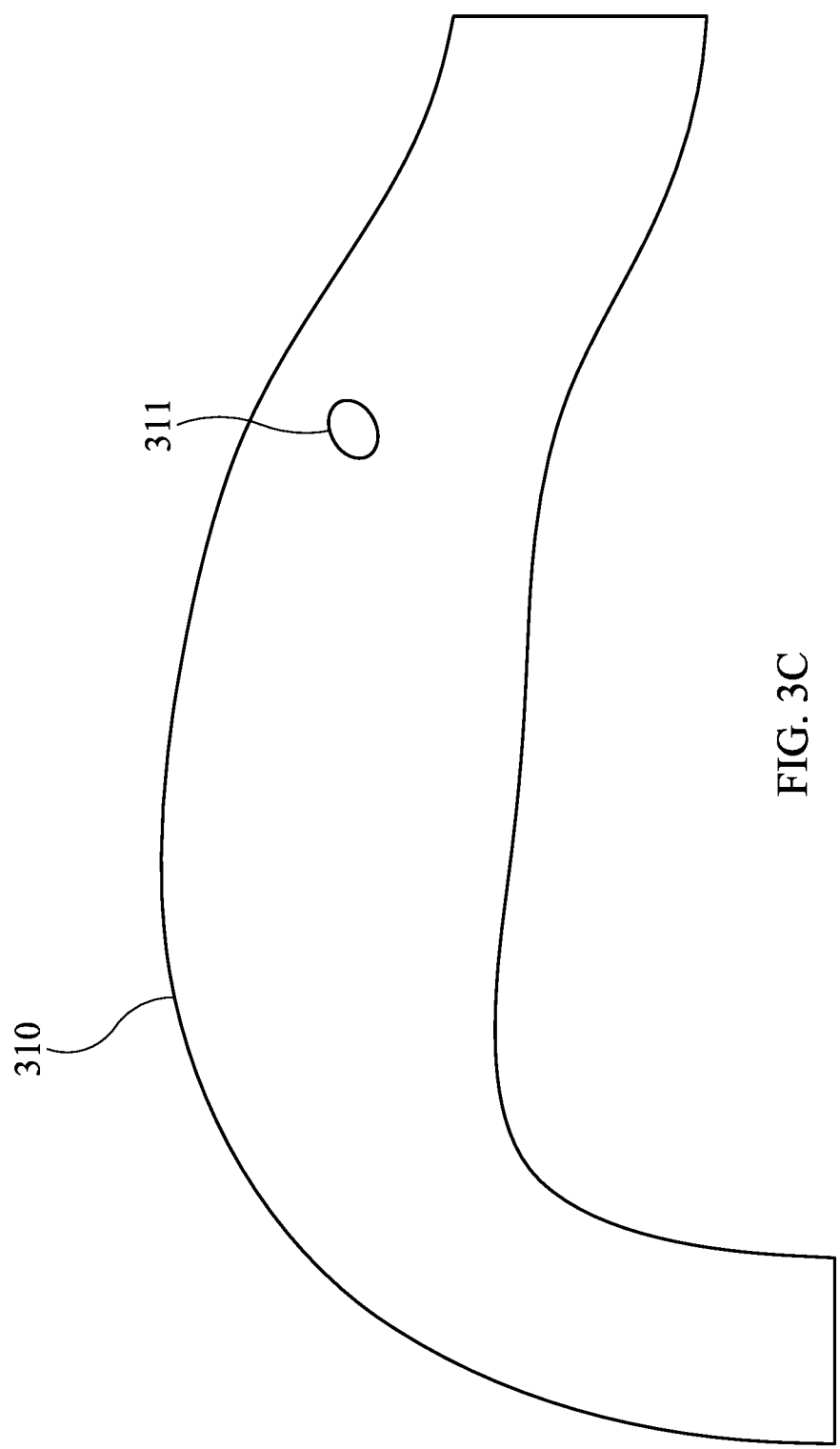
FIG. 3C shows an end view of the tank and related structure shown in FIG. 3B, and in accordance with various embodiments.
Figure 3D:
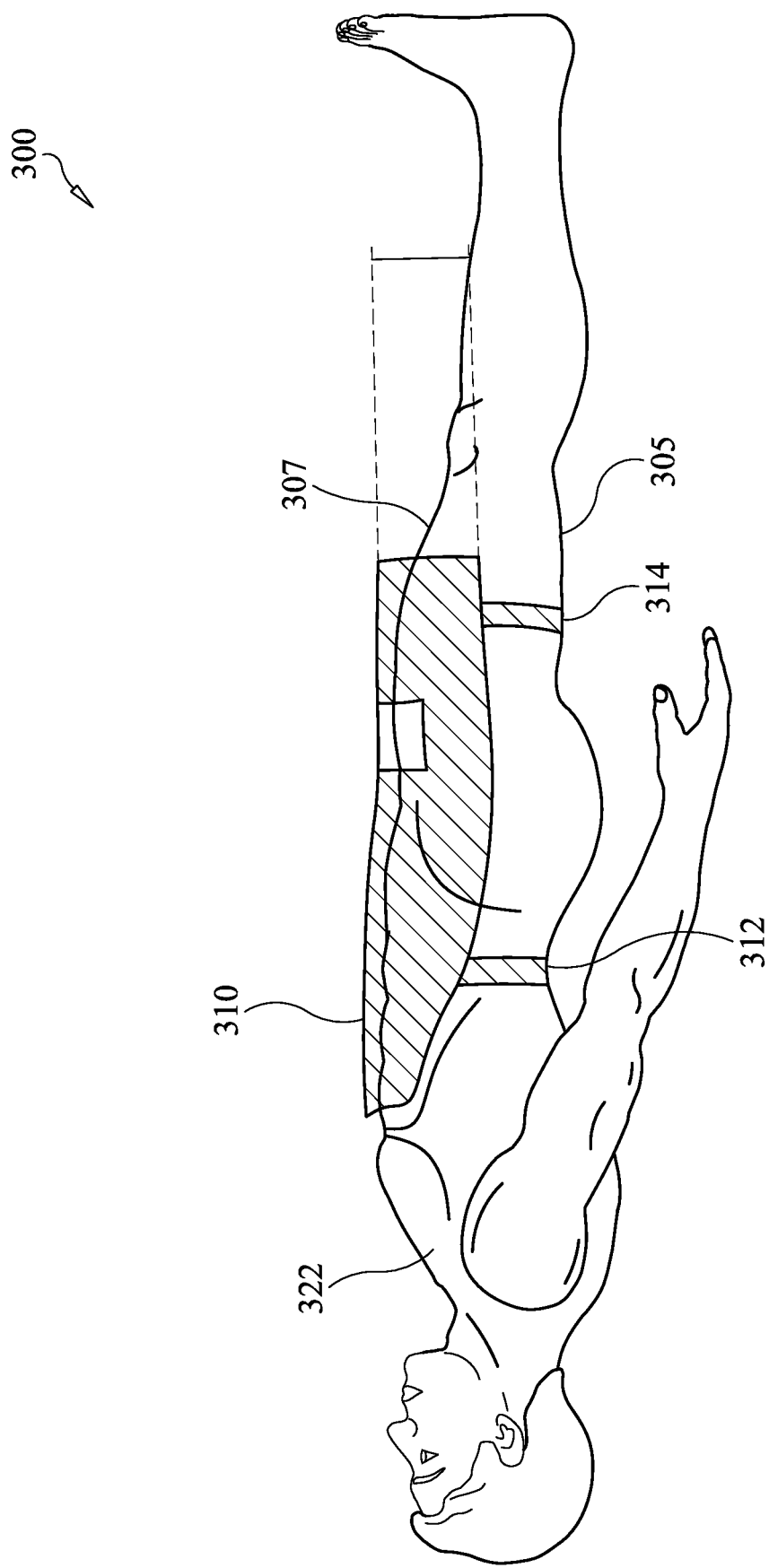
FIG. 3D shows a side view of the apparatus of FIG. 3A utilized with the cavernous structure.

Referring to FIG. 3B, the tank 310 is shown separate from related structure, as may be implemented with the cavernous structure of FIG. 3A and in accordance with various embodiments. A port 311 may be included for filling or draining the tank 310, and may also be used for coupling a pump thereto. FIG. 3C shows an end view of the tank 310 as depicted in FIG. 3B. FIG. 3D shows a side view of the apparatus of FIG. 3A utilized with the cavernous structure 305.

Referring back to FIG. 3A, cannula may be inserted via the pliable surface structure 320 and respective tubes therein, and coupled to an external pump 350 as shown. The length "L" of the tank is sufficiently long to facilitate insertion of cannula to a length representative of cannulating a human, such as a length of 20 inches. The width "W" of the tank can be set to suit the overall tank size and volume, and may be about 6 inches. The tank 310 and pliable surface structure 320 may be implemented in accordance with various embodiments herein, including those characterized with the other figures. For instance, the external pump 350 may be an ECMO machine utilized in oxygenating human blood.

The tank 310 can be formed with an underlying surface structure that conforms to a training manikin, implemented as 305. For this approach, straps may be used to strap the tank 310 to the training manikin 305, with straps 312 and 314 depicted in FIG. 3D by way of example. In various embodiments, the tank 310 is integrated within such a training manikin 305, forming part of an upper surface 307 as noted in FIG. 3D (e.g., the tank 310 may be lowered/embedded therein).

In some embodiments, a remote location is used for a second pliable surface structure 322, as shown near the neck of the cavernous structure 305. A cannula may be inserted via the second pliable surface structure 322, and coupled to the pump 350. This approach may utilize a second tank 324, with the second pliable surface 322 on a surface of the second tank. The second tank 324 may have an underlying surface with curvature that conforms to the training manikin 105, or may be implemented within the training manikin. This approach may also omit such a tank (such as shown in FIG. 3D), with a second pliable surface structure 322 coupled to tank 310 via a tube. With these approaches, cannulas can be inserted via both pliable surface structures, to facilitate training operations.

Figure 4:
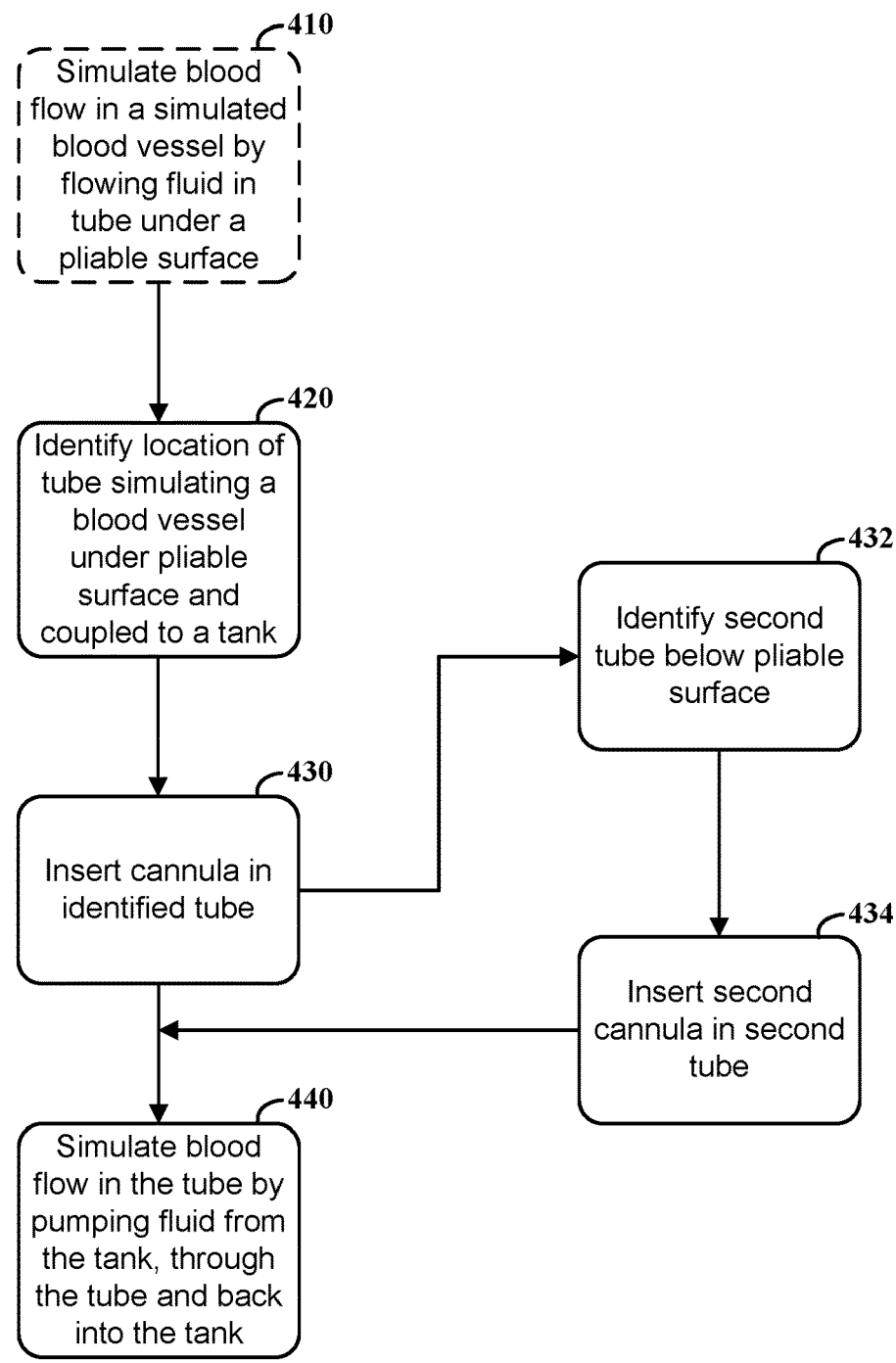
FIG. 4 shows a method for simulating cannulation, as may be implemented in accordance with various embodiments.

FIG. 4 shows a method for simulating cannulation, as may be implemented in accordance with various embodiments. At block 410, an optional step is shown in which blood flow is simulated with a simulated blood vessel, but flowing fluid in a tube under a pliable surface. This may involve, for example, utilizing a peristaltic pump to simulate flow in the tube. At block 420, the location of such a tube simulating a blood vessel (and being connected to a tank) is identified, which may involve detecting pulsatile flow and/or determining the presence of the tube without fluid flow therein. A cannula is inserted into the identified tube at block 430, and blood flow is simulated in the tube by pumping fluid from the tank, through the tube and back into the tank. This may involve, for example, pumping fluid directly out of the tank, through the tube via the cannula and back into the tank. This may otherwise involve pumping fluid out of the tank via the tube and cannula, and back into the tank. Such embodiments may be employed in connection with apparatuses shown and described herein, such as with those shown in FIGS. 3A-3D.

In some implementations, a second tube is identified below a pliable surface at block 432, and a second cannula is inserted into the second tube at block 434. This may utilize the same pliable surface noted and a second cannula is inserted, or another pliable surface at a remote location. For instance, as shown in FIG. 3A, this approach may involve inserting two cannulas at 310, or respective cannula at 310 and 322. With two cannulas, the process at block 440 may involve drawing fluid out of the tank via one of the cannulas, and returning fluid back into the tank via the other cannula.

Based upon the above discussion and illustrations, those skilled in the art will readily recognize that various modifications and changes may be made to the various embodiments without strictly following the exemplary embodiments and applications illustrated and described herein. For example, Such modifications do not depart from the true spirit and scope of various aspects of the invention, including aspects set forth in the claims.

What is claimed is:

1. An apparatus comprising:
a pliable surface structure having an inner surface and an outer surface;
a tube adjacent the inner surface of the pliable surface structure, the tube being configured and arranged with the pliable surface structure to simulate a blood vessel below the inner surface of the pliable surface structure; and
a tank configured to hold fluid and to receive fluid exiting from the tube, the tank being configured and arranged with the tube and the pliable surface structure to receive a cannula passed through the pliable surface structure, into the tube and extending into the tank, and to facilitate simulated blood flow in the tube below the inner surface of the pliable surface structure via fluid pumped from the tank, through the tube and back into the tank.

2. The apparatus of claim 1, further including a pump configured and arranged with the tank and the tube to provide fluid flow through the tube that simulates the blood flow.

3. The apparatus of claim 2, wherein the pump is a peristaltic pump configured and arranged to simulate pulsatile blood flow through the tube to represent an artery.

4. The apparatus of claim 1, further including a second tube extending into the tank, the second tube being configured and arranged with the tank and said tube extending adjacent the inner surface to, in response to cannulation of the tubes with cannula and connection of the cannula to an external pump, draw fluid from the tank into the external pump via the second tube, and pass fluid from the external pump into the tank via the tube extending adjacent the inner surface.

5. The apparatus of claim 4, wherein the second tube extends adjacent the inner surface of the pliable surface structure and is configured to simulate a blood vessel below the inner surface of the pliable surface structure.

6. The apparatus of claim 4,
further including, separate from said pliable surface structure, a second pliable surface structure having an inner surface and an outer surface; and
wherein the second tube extends adjacent the inner surface of the second pliable surface structure and is configured to simulate a blood vessel below the inner surface of the second pliable surface structure.

7. The apparatus of claim 4, wherein the fluid tank has a fluid capacity of 3 liters to facilitate simulation of blood flow in a human adult body.

8. The apparatus of claim 1, wherein the fluid tank has a sidewall that includes the pliable surface structure.

9. The apparatus of claim 1, wherein the tube extends into the tank and the tank is configured and arranged with the tube and the pliable surface structure to receive a cannula passed through the pliable surface structure, through the tube and extending out of the tube into the tank.

10. The apparatus of claim 1, further including a cavernous structure having the shape of a human torso and leg, the pliable surface structure being part of an outer surface of the leg and the tank being located within the cavernous structure.

11. The apparatus of claim 1, wherein the fluid tank has an upper surface that includes the pliable surface structure and a lower surface that follows the contours of a training manikin having the shape of a human torso and leg, with the pliable surface being located on a region corresponding to the leg and the tank extending upward along the human torso, with the tube residing in the tank.

12. A method comprising:
inserting a cannula through a pliable surface structure having an inner surface and an outer surface, into a tube extending adjacent the inner surface of the pliable surface structure, and extending into a tank configured to hold fluid and to receive fluid exiting from the tube; and
simulating blood flow in the tube below the inner surface of the pliable surface structure by pumping fluid from the tank, through the tube and back into the tank.

13. The method of claim 12, wherein pumping the fluid includes generating peristaltic flow through the tube, therein simulating pulsatile blood flow through the tube to represent an artery.

14. The method of claim 12, including coupling an external pump to the cannula and pumping fluid from the tank into the external pump, and from the external pump into the tube and tank, via the cannula.

15. The method of claim 12, including inserting a second cannula into a second tube that extends into the tank and coupling an external pump to the second cannula, wherein pumping the fluid from the tank includes pumping the fluid via the second cannula and the second tube to the external pump, and from the external pump back into the tank via said cannula.

16. The method of claim 15, wherein
said pliable surface structure is part of a cavernous structure having the shape of a portion of a human torso and leg, said pliable surface structure being and located on the shape of the leg, and
inserting the second cannula includes inserting the second cannula through a second pliable surface structure having an inner surface and an outer surface that are part of the cavernous structure and on the shape of the torso, the second tube extending adjacent the inner surface of the second pliable surface structure.

17. The method of claim 12, wherein the fluid tank has a sidewall that includes the pliable surface structure.

18. The method of claim 12, wherein the fluid tank has an upper surface that includes the pliable surface structure and a lower surface that follows the contours of a training manikin having the shape of a human torso and leg, further including coupling the tank to the training manikin with the lower surface conforming thereto, and with the pliable surface located on a region corresponding to the leg with the tank extending upward along the human torso.

19. The method of claim 12, wherein inserting the cannula includes inserting the cannula through the tube and extending out of the tube into the tank with the tube extending into the tank.

20. The method of claim 12, wherein pumping the fluid includes using an external extracorporeal membrane oxygenation (ECMO) pump and simulating human vascular response to treatment via the ECMO pump with the cannula, pliable surface, tube and tank.

* * * * *